United States Patent [19]

Zanoli et al.

[11] Patent Number: 5,005,635
[45] Date of Patent: Apr. 9, 1991

[54] REFRACTORY ELEMENTS FOR THE CONSTRUCTION OF HEAT REGENERATORS

[75] Inventors: Alain P. B. Zanoli, Morieres; Joseph Recasens, Sorgues, both of France

[73] Assignee: Societe Europeenne des Produits Refractaires, Courbevoie, France

[21] Appl. No.: 385,142

[22] Filed: Jul. 26, 1989

[30] Foreign Application Priority Data

Aug. 10, 1988 [FR] France ................................ 88 10791

[51] Int. Cl.⁵ .............................................. F28D 17/00
[52] U.S. Cl. ...................................... 165/9.1; 165/9.2
[58] Field of Search ............................ 165/9.1, 9.2, 9.3

[56] References Cited

U.S. PATENT DOCUMENTS

| | | | |
|---|---|---|---|
| 1,961,258 | 6/1934 | Totzek | 165/9.1 |
| 2,839,286 | 6/1958 | Poth | 165/9.3 |

FOREIGN PATENT DOCUMENTS

| | | |
|---|---|---|
| 90455 | 10/1983 | European Pat. Off. . |
| 1272325 | 7/1968 | Fed. Rep. of Germany . |
| 2142624 | 2/1973 | France . |
| 2248748 | 5/1975 | France . |
| 247466 | 7/1987 | German Democratic Rep. . |

Primary Examiner—Albert W. Davis, Jr.
Attorney, Agent, or Firm—Watson, Cole, Grindle & Watson

[57] ABSTRACT

The invention relates to the regenerators of glass melting furnaces. It relates more particularly to a ceramic element for equipping regenerators of glass melting furnaces, having at least one vertical wall, the mean thickness of which is at the most 40 mm, characterized by the presence, on at least one face of this vertical wall, of a plurality of obstacles forming an integral part of the element, the protrusion of the obstacles relative to the base surface of the wall being at least 5 mm, the ratio of the distance separating two consecutive obstacles in the vertical direction to the said protrusion being comprised between 3 and 15, and the angle x formed by the obstacle with the base surface of the wall in the given direction of movement of the fumes and the angle y formed by the obstacle with the base surface of the wall in the given direction of movement of the air to be heated being such that x is less than or equal to y. Application in the glass industry.

10 Claims, 9 Drawing Sheets

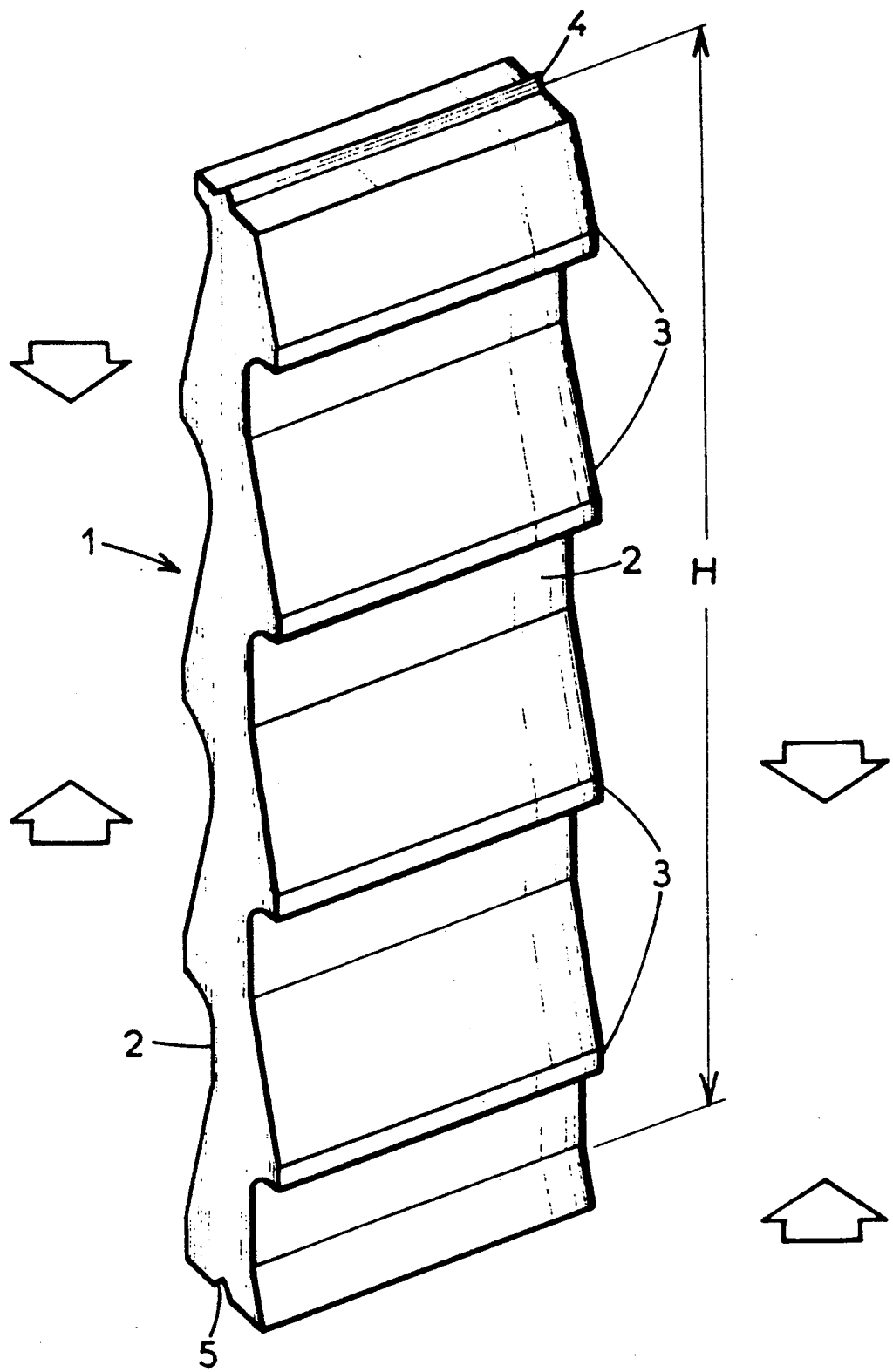
FIG.:1

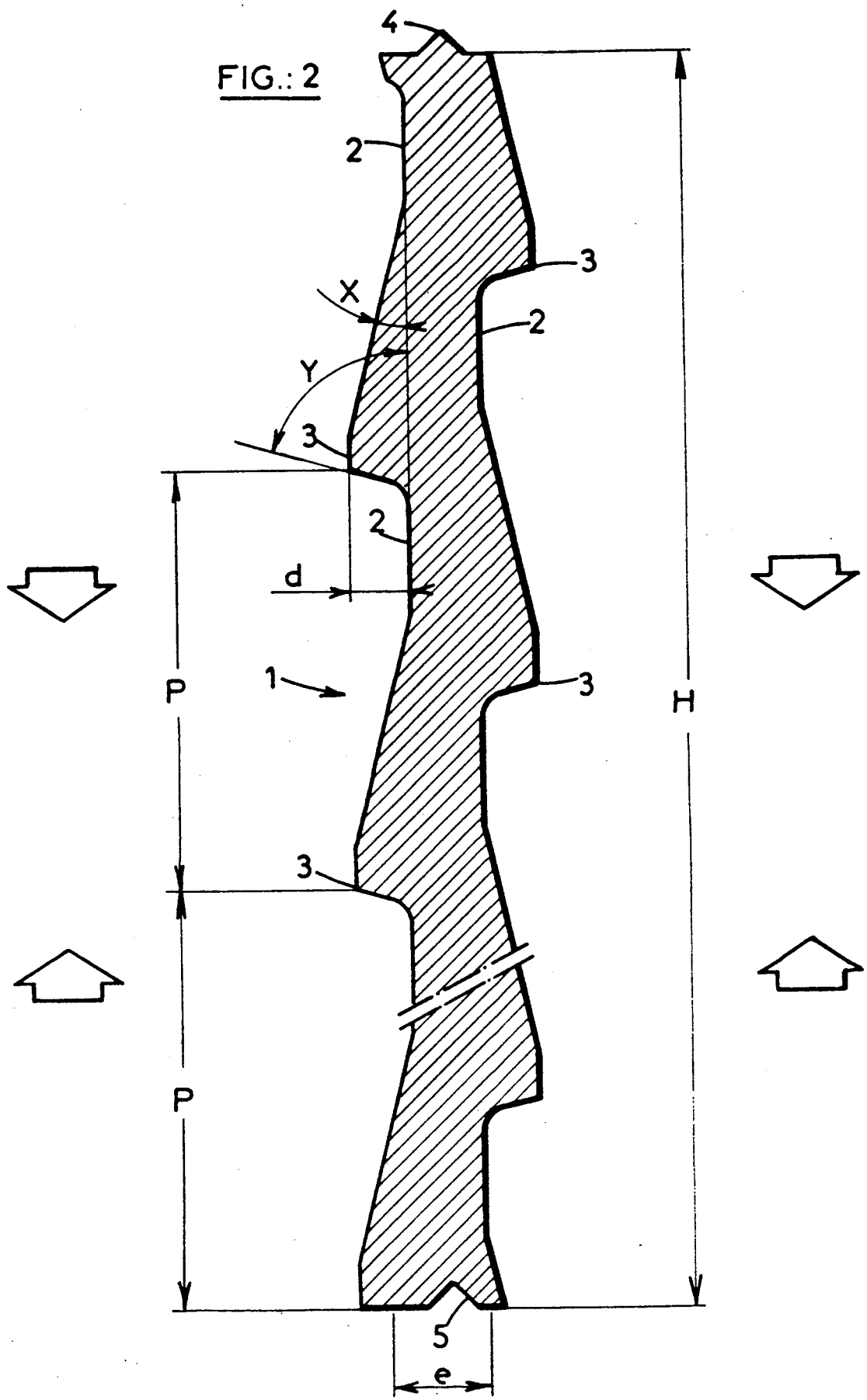
FIG.: 2

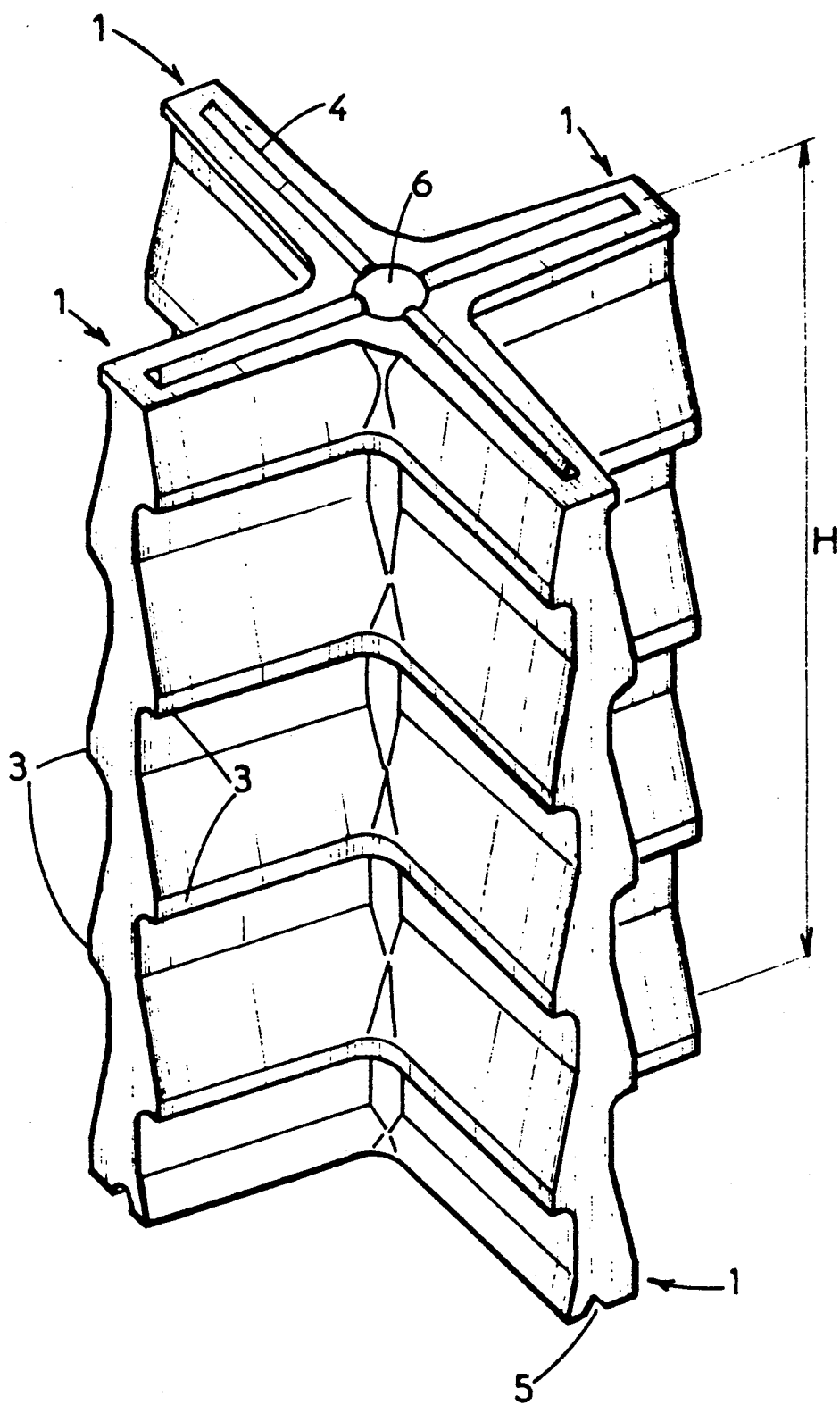
FIG.: 3

FIG.:4A 1 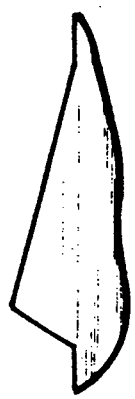 2  3 
FIG.:4B 1 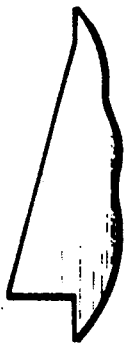 2  3 
FIG.:4C 1  2  3 
FIG.:4D 1  2  3 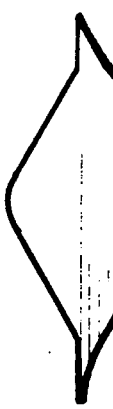

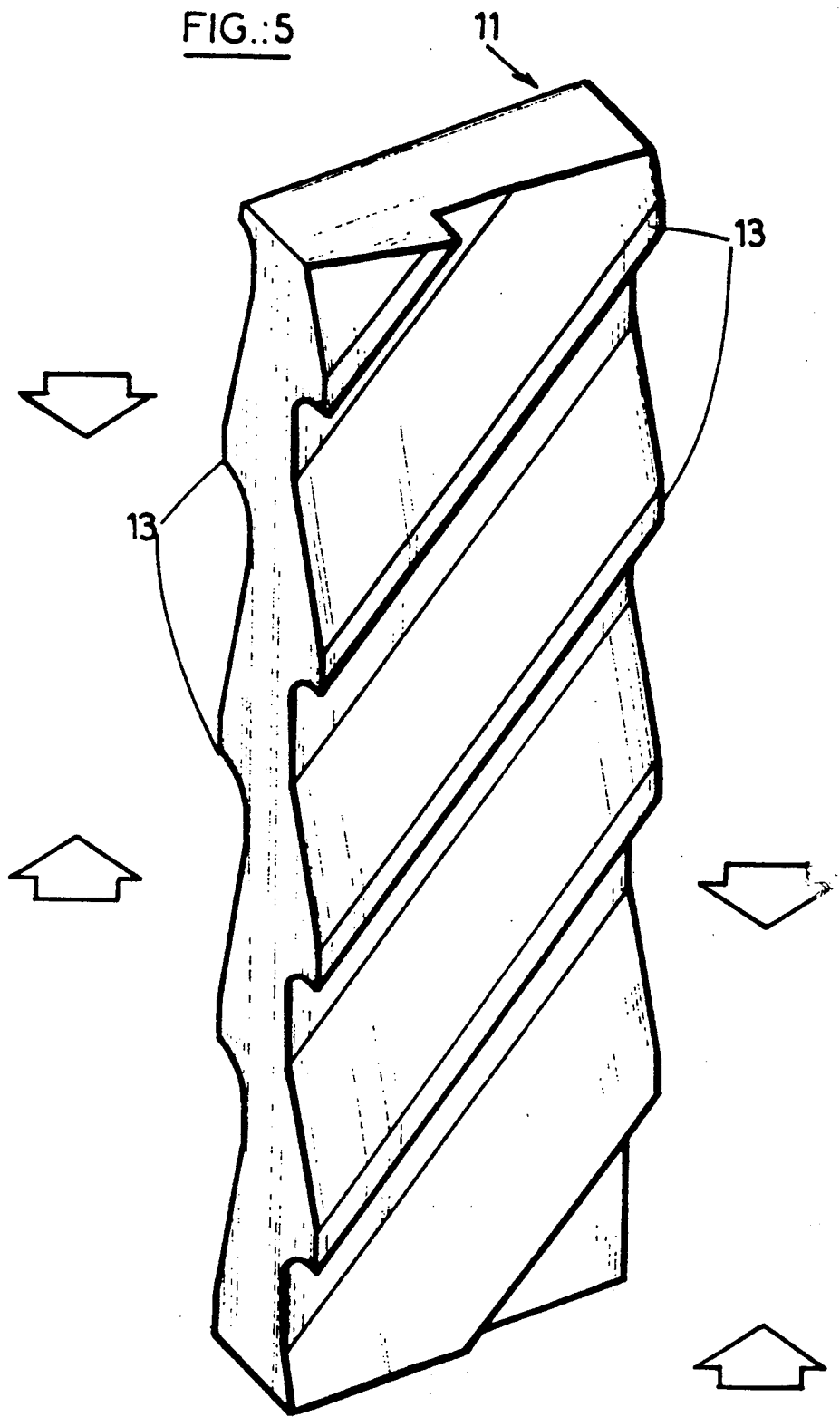

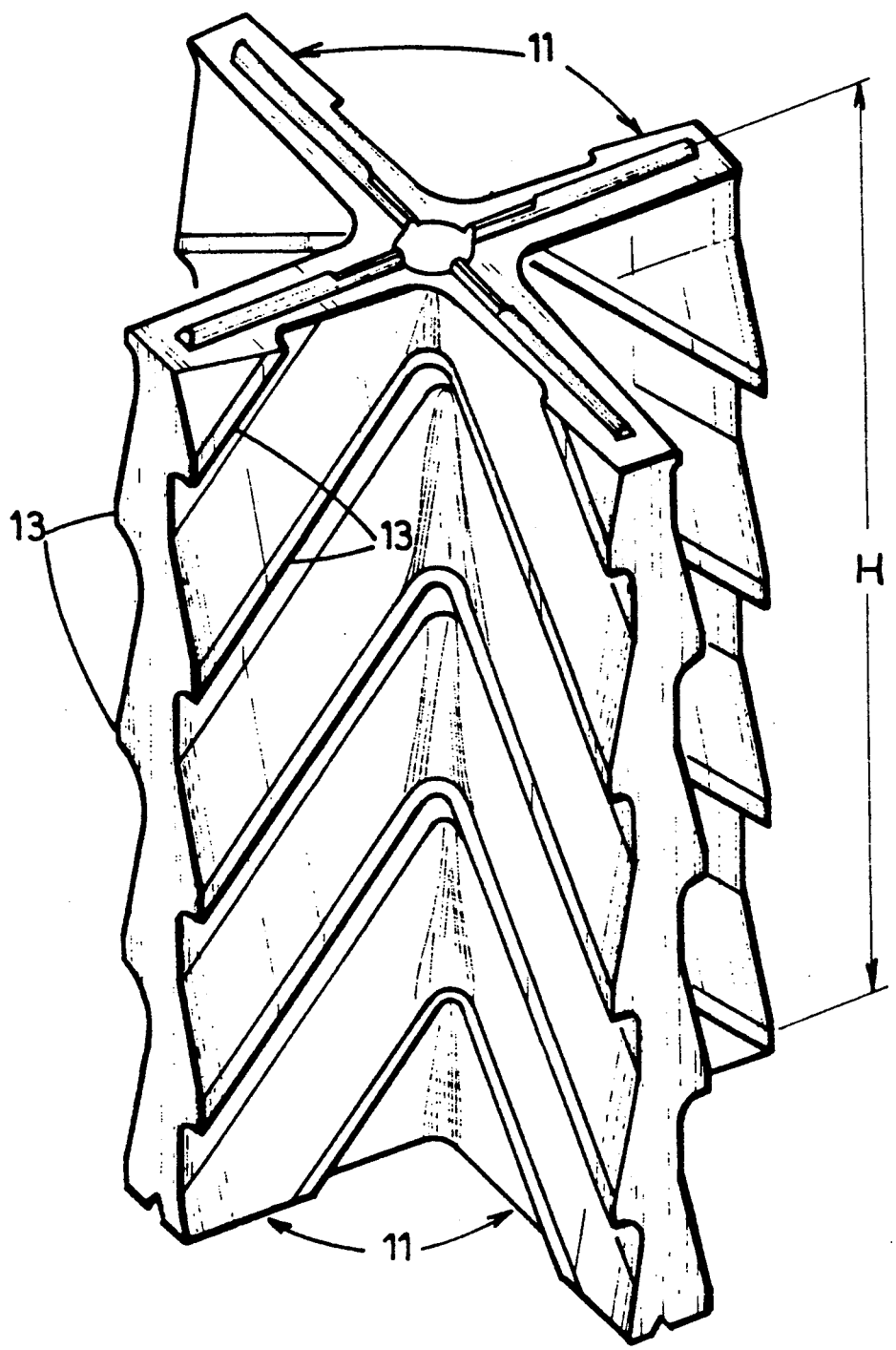
FIG.:6

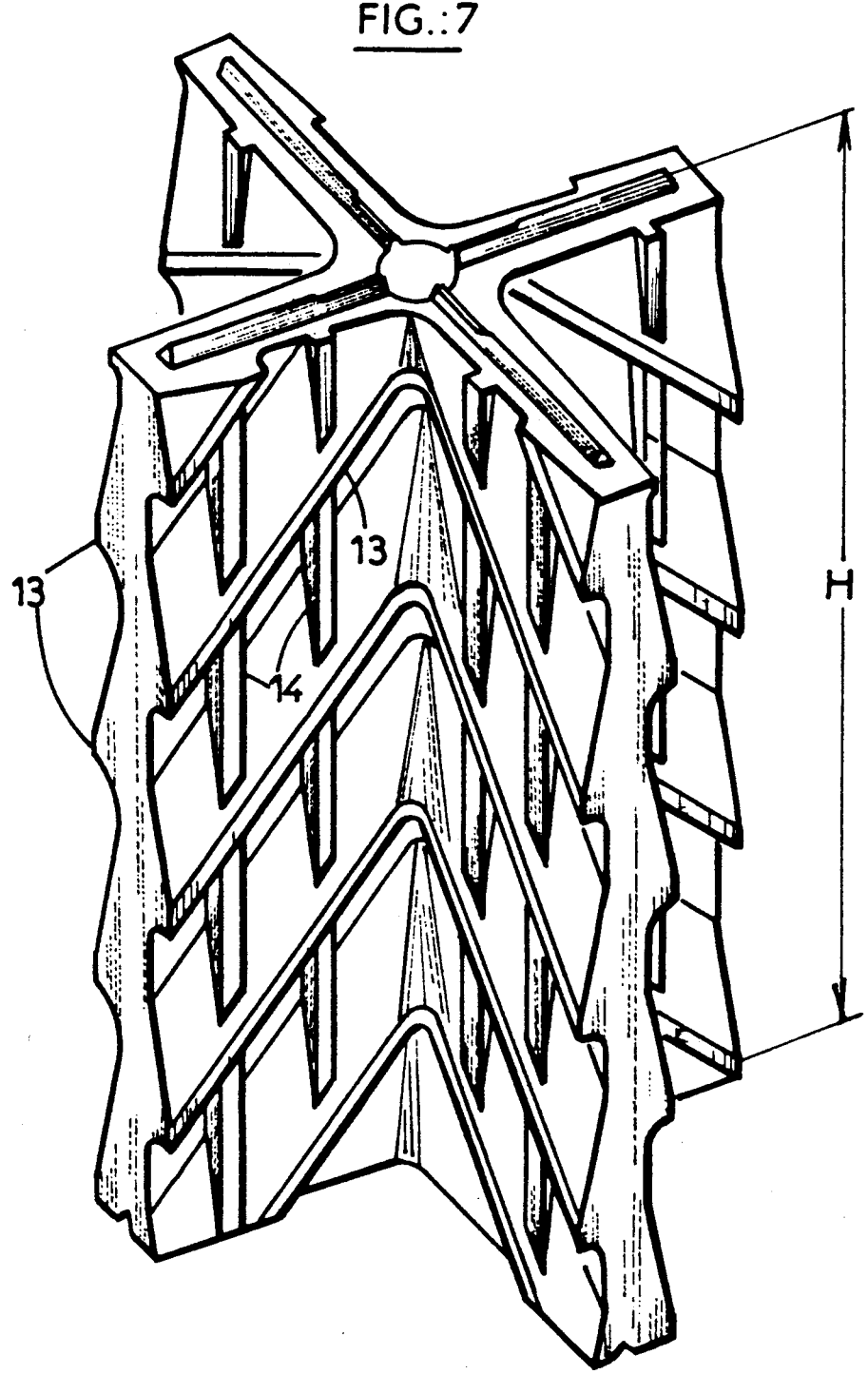
FIG.:7

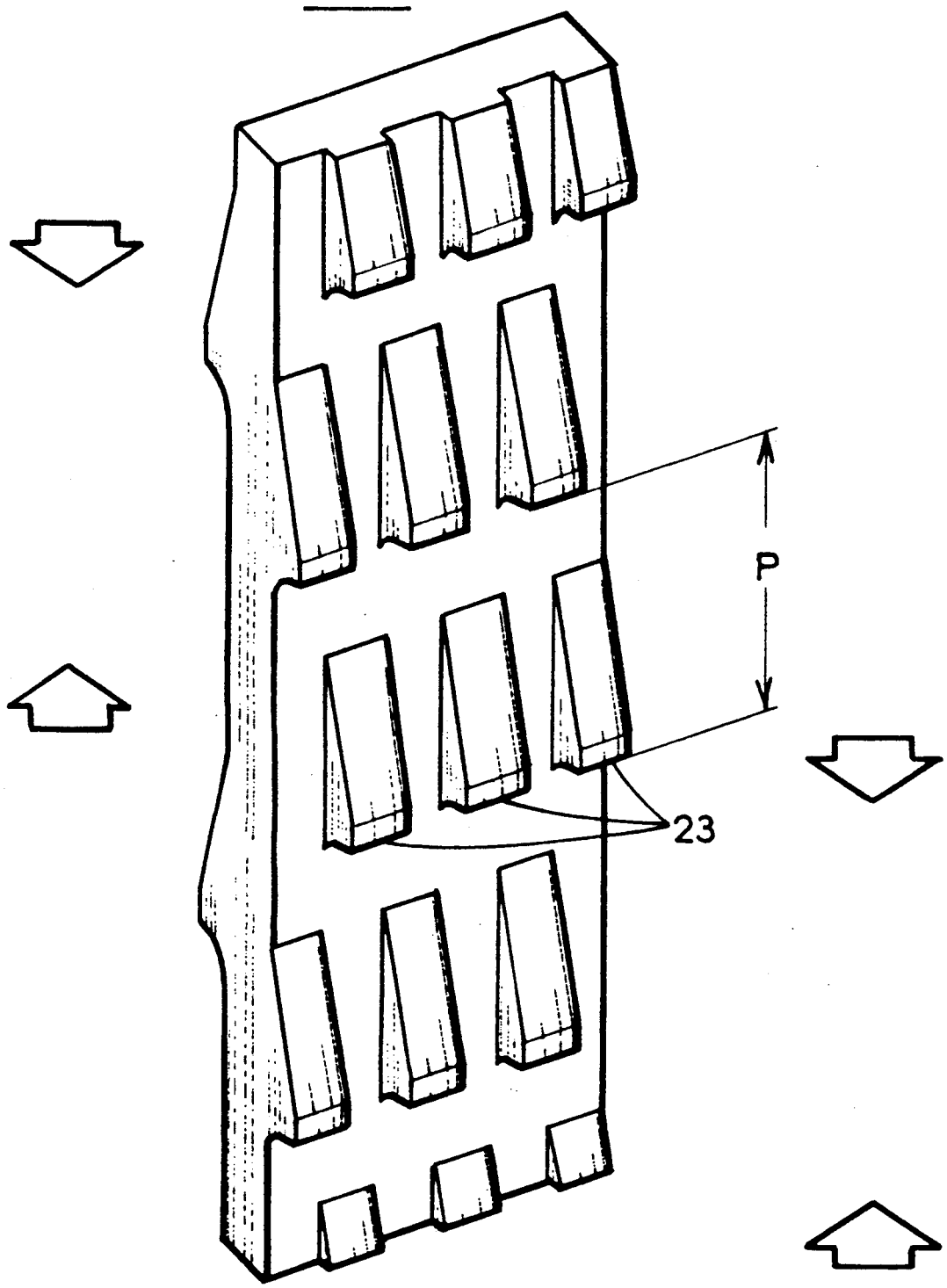

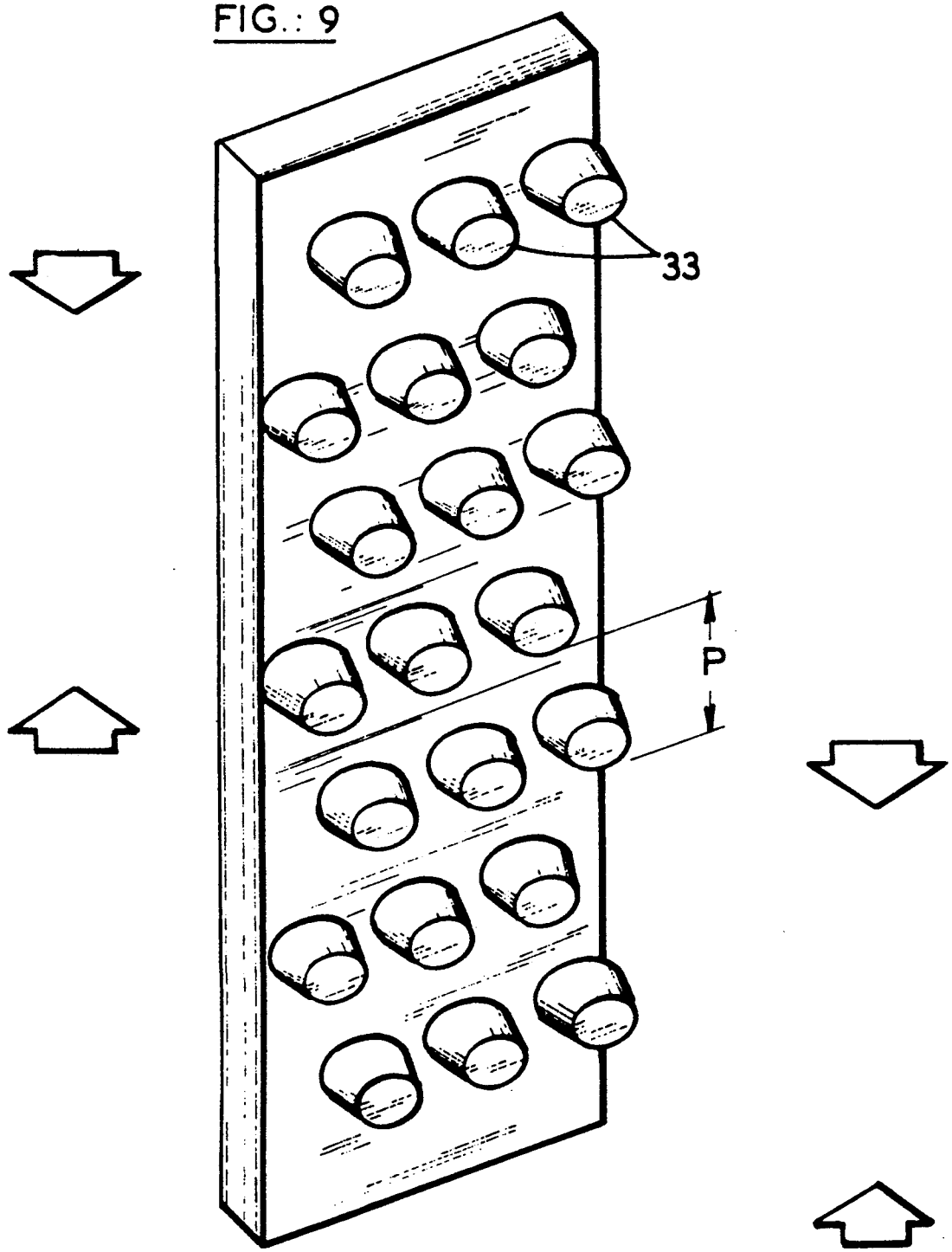
FIG.: 9

REFRACTORY ELEMENTS FOR THE CONSTRUCTION OF HEAT REGENERATORS

BACKGROUND AND SUMMARY OF THE INVENTION

The present invention has been developed in collaboration with the Groupement pour la Recherche sur les Echangeurs Thermiques (GRETH), France, for the realization of similation tests.

In-French Patent No. 2,142,624 describes a stackable monolithic refractory element, useful in particular for equipping the regenerator chambers of glass melting furnaces, consisting of at least three radial arms or flanges, of general parallelepipedal shape, integral via one of their edges with a central connecting part, this element being moulded from one or more refractory oxides previously melted and the radiating arms or flanges being identical and having a thickness at least equal to 50 MM.

Such elements comprising four orthogonal radial arms of constant thickness have been and are still marketed by the Applicant. These elements are commonly referred to as "cross-shaped" elements.

In French Addition Patent No. 2,248,748 to the above patent, the Applicant described a variation of embodiment of the element of Patent No. 2,142,624, according to which the radial arms or flanges have a thickness gradually decreasing from their bottom part to their top part, in order to improve the thermal exchanges as a result of convection between the element and the fluid (air) to be heated.

The great advantage of these "cross-shaped" elements is that they facilitate assembly and, with a single type of element, enable the provision of chequerwork having channels of different cross-section through which the gases and the air pass.

During operation of the chequer chambers of a glass melting furnace regenerator, the hot gases or fumes which originate from the furnace during operation enter into the chequerwork via the top part of the regenerator, releasing their calorific energy into the chequerwork, and are then evacuated via a flue. During this time, cold air supplied at the bottom of another chequerwork heated during the preceding cycle recovers the calorific energy and emerges hot at the top of the chequerwork from where it is conveyed to the burners of the melting furnace so as to ensure combustion of the fuel under optimum consumption conditions.

When the fumes pass into the chequerwork, from the top downwards, they not only release their calorific energy but may also, depending on the operation of the furnace and the type of molten glass, deposit dust or elements volatilized in the melting bath.

These deposits have a tendency to obstruct the channels through which the fumes and the air pass. In order to limit this disadvantage, when it occurs, the "cross-shaped" elements used hitherto tend to create hydraulically smooth channels on account of the flat surface of their flanges and owing to very stable assembly inside channels without any overhanging elements.

Moreover, the optimization, i.e. among other things the increase in the thermal efficiency of the chequerwork of the regenerators, is brought about by the increase in the thermal exchanges between the fluid to be heated and the chequerwork of the regenerator. The increase in these exchanges requires intensification of the thermal exchanges during the most limiting phase of the cycle, i.e. the period when the air passes through. In fact, the refractory/air heat exchange coefficient (convection) is several times smaller than that of the fumes/refractory exchanges (radiation). Care must be taken, however, that the means used do not favour excessively the phenomena of deposition on the parts forming the chequerwork and more particularly in the condensation zones.

There therefore exists a need for improved elements intended to equip the chambers of glass melting furnace regenerators which, while minimizing the deposition phenomena when the fumes pass into the chequerwork, improve the thermal exchanges between the fluid to be heated and the chequerwork of the regenerator.

The invention aims to satisfy this need by supplying novel improved ceramic elements for equipping the regenerators of glass melting furnaces.

More particularly, the invention relates to a ceramic element for equipping regenerators of glass melting furnaces, having at least one vertical wall, the mean thickness of which is at the most 40 mm, characterized by the presence, on at least one face of this vertical wall, of a plurality of obstacles forming an integral part of the element, the protrusion of the obstacles relative to the base surface of the wall being at least 5 mm, the ratio of the distance separating two consecutive obstacles in the vertical direction to the said protrusion being comprised between 3 and 15, and the angle x formed by the obstacle with the base surface of the wall in the given direction of movement of the fumes and the angle y formed by the obstacle with the base surface of the wall in the given direction of movement of the air to be heated being such that x is less than or equal to y. The expression "base surface" is understood as meaning the surface which precedes or follows each obstacle.

The novel element of the invention enables a significant improvement in the regeneration efficiency to be obtained. In fact, the surface obstacles present on the parts enable the refractory/air exchanges to be intensified by disturbing the air flows in the vicinity of the walls previously heated by the fumes.

By "mean thickness" of the wall is meant the thickness of a wall with flat faces having no obstacles, which would have the same volume as the wall with obstacles according to the invention. This mean thickness must be less than or equal to 40 mm.

By "protrusion" of the obstacles is meant the maximum height of the obstacle relative to the base surface of the wall. This protrusion must be at least 5 mm and, preferably, at least 10 mm.

The ceramic element may have very different shapes. They may have the shape of elements with radiating arms or flanges such as those described in the aforementioned French Patent No. 2,142,624, in particular the preferred cross shape with 4 orthogonal radiating arms, but they may also have in horizontal cross-section the general shape of a hollow square, of a hollow hexagon, an L shape or quite simply be formed by a single wall.

According to a preferred embodiment, the two faces of the wall are provided with obstacles.

Each obstacle may extend in a continuous manner over the width of the wall or occupy only a fraction of the latter. In this latter case, there will usually be several obstacles arranged side-by-side but spaced from each other. Also, all or some of the obstacles may be only partly present on a given element, their complementary portion being located on the adjacent element arranged above or below in the chequerwork.

The obstacles present on a wall may all be of identical shape, or a mixture of obstacles of different shapes may be used. The distance separating two consecutive obstacles in the vertical direction may be fixed or varied. The important thing is that the ratio of the distance separating two consecutive obstacles in the vertical direction to the protrusion is comprised between 3 and 15, preferably between 5 and 10.

Observance of this ratio range allows the boundary layer of the air, detached from the wall by an obstacle, to rejoin the wall, i.e. the base surface, before reaching the next obstacle. As a result of this, the major part of intensification of this thermal transfer is effected at the rear of the obstacle in the direction of movement of the air and in front of the next obstacle, in the zone where the flow of this air detached from the wall by the obstacle adheres to it again.

According to a preferred embodiment, the obstacles on one vertical wall face are staggered in the vertical direction relative to the obstacles on the other face of this wall. In other words, the wall viewed in vertical section has an asymmetrical profile.

The staggering of the obstacles on the opposite faces of a same wall enables intensification of the thermal transfer to be applied to best advantage. In fact, it results in the positioning of the thickest parts of the wall opposite the zone where the air flow readheres. Thus, the most intense energy transfer is effected at the points on the wall where the calorific capacities are greatest. Staggering of the obstacles offers, moreover, an additional advantage. Assuming the equivalent element to have a mean thickness, an element with staggered obstacles generally possesses a mechanical strength greater than an element with obstacles which are not staggered (symmetrical). This is due to the fact that the element with staggered obstacles has a minimum local thickness greater than that of the part with obstacles which are not staggered.

The obstacles may, themselves, also have a symmetrical or asymmetrical profile. They are preferably asymmetrical, in particular for the zones of the chequerwork where a deposit may occur. The profile of the obstacles may be characterized by the angle x which it forms with the base surface of the wall in the direction of movement of the fumes (usually from the top to the bottom of the element) and the angle y which it forms with this same surface in the direction of movement of the air to be heated (usually from the bottom to the top of the element). According to the invention, x must be less than or equal to y. Preferably, x will be less than y so that the obstacles offer to the flow of the fumes a surface which is hydraulically as smooth as possible in order to reduce the harmful depositions and offer the flow of the air a surface which is hydraulically as rough as possible in order to improve the thermal exchanges and ensure maximum recovery of the heat stored in the ceramic elements during the previous operating cycle.

The elements of the invention may be manufactured by means of moulding in the molten state refractory ceramic compositions usually used for this kind of application, for example compositions based on alumina (for example, a composition which comprises, by weight, 87.5% of alumina , 8% of magnesia and 4.5% of $Na_2O$) or based on alumina, zirconia and silica (for example, a composition which comprises, by weight, 50.6% of alumina, 32.5% of zirconia 15.6% of silica and 1.1% of $Na_2O$). The composition is melted according to the usual methods commonly used for melting this type of material in an electric arc furnace, a plasma furnace or an induction furnace, and then cast in a mould, for example using the method described in French Patent No. 2,088,185.

The elements of the invention may also be manufactured by moulding of a castable composition such as refractory concrete or a slip, or else by pressing a suitable composition.

The description which will follow, with reference to the drawing, will enable the invention to be properly understood.

BRIEF DESCRIPTION OF THE DRAWINGS

FIG. 1 is a perspective view of a wall of an element according to the invention;

FIG. 2 is a view in vertical section of this wall;

FIG. 3 is a perspective view of a cross-shaped element according to the invention comprising four orthogonal walls such as those of FIGS. 1 and 2;

FIGS. 4A, 1, 2, 3 to 4D, 1, 2, 3 illustrate different variations of obstacle shapes;

FIG. 5 is a perspective view of a wall of another element according to the invention comprising oblique obstacles;

FIG. 6 is a perspective view of a cross-shaped element according to the invention comprising four orthogonal walls provided with obstacles arranged obliquely;

FIG. 7 shows a variation of embodiment of the element of FIG. 6;

FIG. 8 is a perspective view of a variation for the wall of an element according to the invention; and FIG. 9 is a perspective view of another variation for the wall of an element according to the invention.

DETAILED DESCRIPTION OF THE PREFERRED EMBODIMENTS

FIGS. 1 and 2 show a wall of an element according to the invention. This wall, indicated by the general reference 1, of general rectangular shape, has a base surface 2 on which there are erected a plurality of obstacles 3 extending horizontally from the two sides of the wall and over the entire width of each face. The protrusion of each obstacle (maximum height) is equal to d relative to the base surface. The distance separating two adjacent obstacles is indicated by the reference P. Each obstacle forms an angle x with the base surface of the wall in the given direction for the flow of the fumes and an angle y with the base surface of the wall in the given direction for the flow of the air to be heated. In the present case, $x<y$. H denotes the height of the wall. The obstacles 3 present on one of the sides of the wall are staggered relative to those present on the other side of the wall, as shown. Moreover, certain obstacles, situated at the top part or bottom part of the wall, are incomplete, their complementary portion being located on the wall which will be arranged above or below the noted wall in the chequerwork.

The wall has, moreover, at the top, a small rib 4 projecting relative to the upper face of the wall and, at the bottom, a groove 5 of corresponding shape, the purpose of which will be described below.

FIG. 3 shows a cross-shaped element consisting of four walls 1, such as described in connection with FIGS. 1 and 2, integral with a central connecting part 6 and arranged orthogonally in pairs. The function of the small ribs 4 and grooves 5, the respective positions of which may moreover be reversed, is to facilitate, during assembly of the regenerator, adjustment of the spacing existing between the various adjacent elements of a given tier of the chequerwork, the elements not being fixed against one another. Moreover, the fitting of the small ribs of an element into the grooves of the adjacent elements ensures good stability of all the rows. It goes without saying, however, that the use of these small ribs and grooves is not indispensible and that they may be substituted by equivalent means, or even eliminated.

It should be noted also that, in the vicinity of the free lateral ends of the walls, the obstacles could be tapered (chamfered) either on a single face of each wall, or on both faces, if required.

FIGS. 4A, 1, 2, 3 to 4D, 1, 2, 3, show various profiles of obstacles which can be substituted for the profile of the obstacles in FIGS. 1 and 2 (the profile of which corresponds to that of FIGS. 4A, 2), thus illustrating the great diversity of obstacle profiles which may be used. It should be noted that FIGS. 4D, 1, 2 and 3 show profiles where $x=y$.

FIG. 5 shows a wall 11 provided with obstacles 13 having a profile similar to that of the obstacles of the wall of FIGS. 1 and 2, but which differs from the wall of the said figures owing to the fact that these obstacles are arranged obliquely along an ascending slope, instead of being horizontal.

FIG. 6 shows a cross-shaped element consisting of four walls provided with obstacles arranged obliquely, as illustrated by FIG. 5. As can be seen, the oblique obstacles of the opposite faces of two adjacent walls form sorts of chevrons With such an element, improvement of the heat transfer is reinforced by the convergence of the air flows towards the central part connecting the walls.

FIG. 7 shows an element derived from that of FIG. 6. This element differs from that of FIG. 6 in that it includes, moreover, secondary obstacles 14 oriented in the vertical direction, extending between the adjacent oblique obstacles 13. This enables even greater advantage to be obtained from the thermal standjoint of the portion of the air flow moving obliquely along the oblique obstacles. The vertical obstacles 14 perform, in fact, for this oblique air flow, the same function as the obstacles 13 for the vertical air flow. The secondary obstacles 14 satisfy the general conditions mentioned for the obstacles, except that the distance separating two consecutive secondary obstacles must be measured in the horizontal direction and not in the vertical direction.

FIG. 8 shows a wall of an element provided no longer with obstacles extending continuously over the entire width of the wall, but having discontinuities. More precisely, each obstacle 3 (FIGS. 1 and 2) is replaced, in the embodiment shown, by three similar obstacles 23 having a profile such as that of the obstacles of FIGS. 1 and 2, the obstacles situated at a given level of the wall being in addition staggered laterally relative to those of the levels immediately below and above.

FIG. 9 shows a variation of embodiment of the element of FIG. 8. In this variation, the obstacles 33, instead of having a profile similar to that described in connection with FIGS. 1 and 2, have the shape of a truncated cone ($x=y$).

It goes without saying that modifications may be made to the embodiments which have been described, in particular by substituting equivalent technical means, without thereby departing from the scope of the present invention.

We claim:

1. A ceramic element for equipping regenerators of glass melting furnaces, having at least one vertical wall, the mean thickness of which is at the most 40 mm, characterized by the presence, on opposite faces of this vertical wall, of a plurality of obstacles forming an integral part of the element, the protrusion of the obstacles relative to the base surface of each face of the wall being at least 5 mm, the ratio of the distance separating two consecutive obstacles in the vertical direction to the said protrusion of each face being comprised between 3 and 15, and the angle x formed by the obstacle with the base surface of each face of the wall in the given direction of movement of the fumes and the angle y formed by the obstacle with the base surface of each face of the wall in the given direction of movement of the air to be heated being such that x is less than y, the obstacles on one vertical wall face being staggered in a vertical direction relative to the obstacles on the opposite vertical wall face.

2. An element according to claim 1, characterized in that the protrusion is at least 10 mm.

3. An element according to claim 1, characterized in that the said ratio is comprised between 5 and 10.

4. An element according to claim 1, characterized in that the obstacles are arranged horizontally.

5. An element according to claim 1, characterized in that the obstacles extend continuously over the width of the wall.

6. An element according to claim 1, wherein said obstacles are obliquely arranged.

7. An element according to claim 6, including vertical secondary obstacles extending between adjacent obliquely arranged obstacles.

8. An element according to claim 1, wherein said obstacles extend continuously over a width of the wall.

9. An element according to claim 1, comprising four walls extending away from a central part in orthogonal pairs.

10. A regenerator of a glass molding furnace which comprises a chamber formed of a checkerwork arrangement of elements defined in claim 1.

* * * * *